United States Patent
Ishikawa

(10) Patent No.: US 6,167,783 B1
(45) Date of Patent: Jan. 2, 2001

(54) FLEXIBLE MESHING TYPE GEARING HAVING THREE-DIMENSIONAL, NON-INTERACTIVE WIDE-AREA INTERMESHING TOOTH PROFILE

(75) Inventor: Shoichi Ishikawa, Kanagawa-ken (JP)

(73) Assignee: Harmonic Drive Systems, Inc., Tokyo (JP)

(*) Notice: Under 35 U.S.C. 154(b), the term of this patent shall be extended for 0 days.

(21) Appl. No.: 09/355,269
(22) PCT Filed: Jul. 27, 1998
(86) PCT No.: PCT/JP98/03370
    § 371 Date: Jul. 27, 1999
    § 102(e) Date: Jul. 27, 1999
(87) PCT Pub. No.: WO99/28651
    PCT Pub. Date: Oct. 6, 1999

(30) Foreign Application Priority Data
Nov. 28, 1997 (JP) .................................... 9-327336

(51) Int. Cl.[7] ........................ F16H 33/00; F16H 35/00; F16H 37/00
(52) U.S. Cl. ................ 74/640; 74/462; 74/457; 74/460
(58) Field of Search ............... 74/640, 462, 457, 74/460

(56) References Cited

U.S. PATENT DOCUMENTS

| | | | |
|---|---|---|---|
| 2,906,143 | 9/1959 | Musser | 74/640 |
| 5,458,023 | * 10/1995 | Ishikawa et al. | 74/640 |
| 5,662,008 | * 9/1997 | Aubin et al. | 74/640 |
| 5,715,732 | * 2/1998 | Takizawa et al. | 74/640 |

FOREIGN PATENT DOCUMENTS

| | | |
|---|---|---|
| 45-41171 | 12/1970 | (JP) . |
| 59-113342 | * 6/1984 | (JP) . |
| 60-184750 | * 9/1985 | (JP) . |
| 62-75153 | 4/1987 | (JP) . |
| 63-115943 | 5/1988 | (JP) . |
| 2-62461 | 3/1990 | (JP) . |
| 4-277354 | 10/1992 | (JP) . |
| 5-172195 | 7/1993 | (JP) . |
| 5-172196 | 7/1993 | (JP) . |
| 5-209655 | 8/1993 | (JP) . |
| 7-167228 | 7/1995 | (JP) . |

* cited by examiner

Primary Examiner—Charles A Marmor
Assistant Examiner—Tisha D. Waddell
(74) Attorney, Agent, or Firm—Burns, Doane, Swecker & Mathis, L.L.P.

(57) ABSTRACT

The meshing of the rigid internal gear and the cup-shaped flexible external gear of a flexible meshing type gear device is simulated with racks, similarity transformation is effected on the composite curve consisting of the envelope obtained by axially projecting the movement loci of the rack teeth relative to each other from the tooth trace opening portion to the tooth trace inner extremity in sections perpendicular to the axis and the movement locus in the vicinity of the tooth trace inner extremity, and the resulting curve is adopted as the basic addendum profile of the external teeth and the internal teeth. Next, the rack axial direction deviation from the rack-approximated tooth profile at the contact point in sections perpendicular to the axis that arises in actual meshing is resolved into that caused by the inclination angle of the tooth center line of the external tooth of the flexible external gear relative to the tooth space center line of the internal tooth of the rigid internal gear and that caused by shift of the movement locus of the tooth of the flexible external gear from the rack movement locus, and the basic addendum profile of the external gear and the internal gear is corrected so that the algebraic sum of the resolved deviations becomes zero. The dedendum profile of both gears is formed by effecting similar correction. As a result, the two gears effect continuous contact meshing along the tooth trace without occurrence of interference.

2 Claims, 8 Drawing Sheets

Fig. 1
(a)
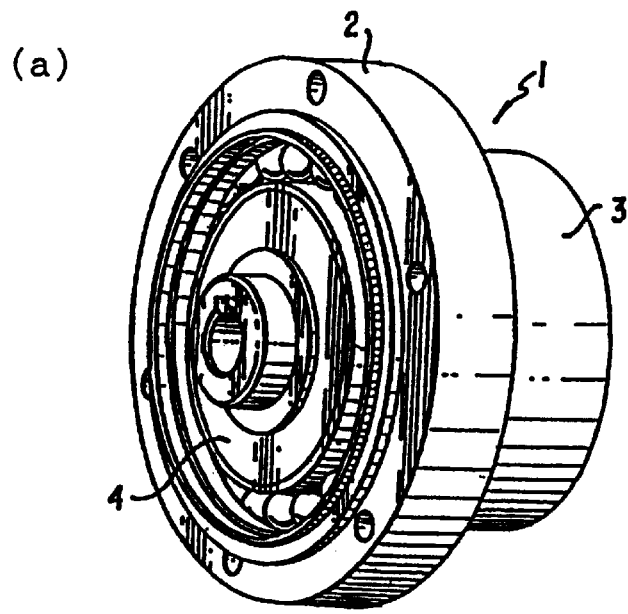
(b)
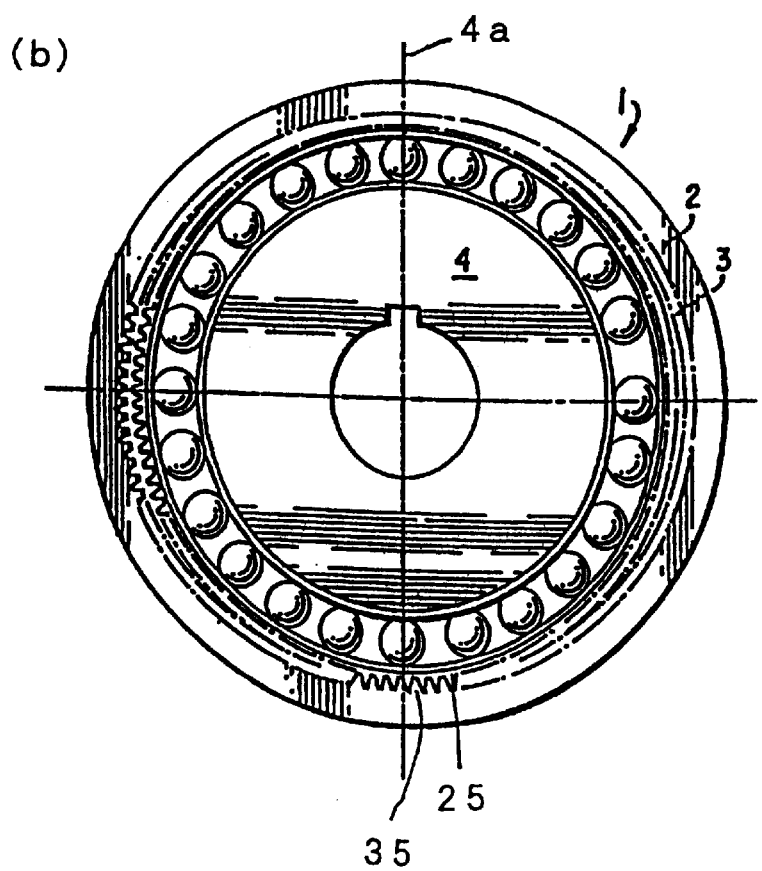

FLEXIBLE MESHING TYPE GEARING HAVING THREE-DIMENSIONAL, NON-INTERACTIVE WIDE-AREA INTERMESHING TOOTH PROFILE

TECHNICAL FIELD

This invention relates to a flexible meshing type gear device. More particularly, this invention relates to the tooth profiles of a rigid internal gear and a flexible external gear used in a flexible meshing type gear device.

BACKGROUND OF THE INVENTION

A flexible meshing type gear device typically consists of a rigid circular internal gear, a flexible external gear which has 2g (g being a positive integer) fewer teeth than the internal gear and which is disposed inside the internal gear and flexed into an elliptical shape so as to mesh with the internal gear at, for example, two places, and a wave generator fitted inside the external gear for flexing it into the elliptical shape.

A cup-shaped flexible external gear is known to the art which comprises a cylindrical body, an annular diaphragm formed continuously with one end of the cylindrical body to extend radially inward, a boss formed integrally with the center of the diaphragm, and external teeth formed on the outer periphery of an opening portion of the cylindrical body. Also known to the art is a silk-hat-shaped flexible external gear comprising an annular diaphragm formed to extend radially outward continuously from one end of a cylindrical body and an annular boss formed to continue from the outer edge of the diaphragm.

In a flexible meshing type gear device equipped with such a cup-shaped or silk-hat-shaped flexible external gear, the wave generator flexes a section of the body of the flexible external gear perpendicular to an axis of the body so that the amount of flexing increases from the diaphragm side thereof toward the open end side thereof approximately in proportion to distance from the diaphragm, the external teeth positioned at the extremities of the major axis of the elliptical shape are made to mesh with the internal teeth of the rigid internal gear, and rotation of the wave generator moves the mesh positions of the two gears in the circumferential direction to produce relative rotation between the two gears.

Although the early tooth profiles of gears were linear (see U.S. Pat. No. 2,906,143), the present inventor demonstrated the possibility of using involute gears (see JP-B 45-41171). In addition, for increasing load capacity, the inventor proposed a system using as the addendum profiles of both gears the curve obtained by similarity-transforming the movement locus, at a reduction ratio of ½, over a prescribed range from the meshing limit point on the locus based on the rack approximation of the tooth of the external gear relative to the internal gear (JP-A 63-115943). This is a system for obtaining continuous contact between the addendum profiles of the two gears.

However, these earlier inventions give no consideration to the three-dimensional phenomenon called coning in which the insertion of the elliptical wave generator causes the amount of flexing (half the difference between the major and minor axes of the ellipse) to gradually increase from the diaphragm side toward the end of a cup-shaped or silk-hat-shaped flexible external gear approximately in proportion to the distance from the diaphragm.

In consideration of this coning, the inventor thereafter developed novel tooth profiles enabling provision of flexible meshing type gear devices capable of achieving a wide mesh range, without interference, over the entire tooth trace of the cup-shaped flexible external gear. These profiles are described, for example, in JP-A 4-277354, JP-A 5-172195, JP-A 5-172196 and JP-A 5-209655. Other improved tooth profiles are proposed in, for example, JP-A 62-75153, JP-A 2-62461 and JP-A 7-167228. Among these, JP-A 7-167228 is of particular interest in that it utilizes tooth inclination to eliminate tooth profile interference.

The performance being demanded of flexible meshing type gear devices is becoming increasingly sophisticated. To respond to this demand, it is necessary to further improve device strength, rigidity and wear resistance. Further consideration must be given to the tooth profile to achieve these improvements. The basic tooth profiles derived from the movement locus obtained by rack approximation must also be considered in light of the tooth inclination and change in tooth movement locus that arise in the case of finite teeth.

The invention set out in the aforesaid JP-A 7-167228 ('228) is an improvement that focuses on tooth inclination to eliminate tooth interference. However, the '228 invention does not sufficiently analyze tooth inclination and, moreover, gives no consideration to change in tooth movement locus. Thus, while the '228 invention succeeds in avoiding tooth interference, it fails to maintain the feature to which the basic tooth profiles are directed, namely, the ability to achieve a wide mesh range. Specifically, while it takes into account the angle the tooth center line of the flexible external gear makes with the radial line from the gear center, it does not take into account the angle this tooth center line makes with the tooth space center line of the rigid internal gear (the true tooth inclination angle) and further ignores the point that the tooth movement locus of the flexible external gear differs from the case of a rack. It therefore overestimates the amount of interference. In addition, the '228 invention does not take into account the coning caused by the change in the amount of deflection of the flexible external gear and its tooth profile is therefore valid only in a non-deviated specific section having a standard amount of deflection.

Also with consideration to coning, the inventor developed a rack-approximated tooth profile that effects proper meshing over the entire tooth trace (see JP-A 5-172195). Although this tooth profile is effective when the gear has a large number of teeth (e.g., over 200) and can be viewed as a rack, tooth profile interference arises when the number of teeth is small (e.g., under 100).

DISCLOSURE OF THE INVENTION

The object of this invention is to provide a tooth profile in a flexible meshing type gear device that, by taking into account tooth inclination and change in movement locus of the origin of the tooth profile coordinate system, enables proper wide-range tooth meshing over the entire tooth trace even when the number of teeth is small.

This invention overcomes the problems set out above by fundamentally improving the tooth profiles. Specifically, this invention adopts a convex curve simulating the composite movement locus obtained by rack approximation as the basic addendum profile of both the rigid internal gear and the flexible external gear and corrects the convex curve in consideration of, in the case of a finite number of teeth, (a) the inclination of the tooth center line of the flexible external gear with respect to the tooth space center line of the rigid internal gear in sections perpendicular to the axis and (b) the actual movement locus of the flexible external gear, and further forms the dedendum profile of the rigid internal gear as one enveloped by the addendum profile of the flexible external gear in a section through an opening portion.

More specifically, this invention provides a flexible meshing type gear device including a rigid internal gear, a cup-shaped or silk-hat-shaped flexible external gear and a wave generator, the flexible external gear including a cylindrical body, an annular diaphragm formed continuously with one end of the cylindrical body to extend radially inward or outward, a boss formed at the center or continuously with an outer edge of the diaphragm and external teeth formed on an outer peripheral surface of an opening portion of the body, the external teeth being capable of meshing with internal teeth formed on an internal peripheral surface of the rigid internal gear, the wave generator flexing sections of the body of the flexible external gear perpendicular to the axis of the body into an elliptical shape such that the amount of flexing increases from the diaphragm side thereof toward the opening portion thereof approximately in proportion to distance from the diaphragm, thereby meshing external teeth located at opposite ends of the major axis of the ellipse with internal teeth, rotation of the wave generator moving the mesh positions of the two gears in the circumferential direction to produce relative rotation between the two gears, the tooth profiles of the two gears being formed as follows.

To start with, both gears are defined as spur gears of module m, the number of teeth of the flexible external gear as $z_F$, the number of teeth of the rigid internal gear as $z_C = z_F + 2g$ (g being a positive integer), the amount of radial flexing of the tooth trace opening portion of the flexible external gear in a section perpendicular to the axis as $\kappa_e$ gm ($\kappa_e \leq 1$, $\kappa_e$: opening portion flexion coefficient), and the amount of radial flexing of the inner extremity of the tooth trace of the flexible external gear as $\kappa_i$ gm ($\kappa_i < \kappa_e$, $\kappa_i$: inner extremity flexion coefficient).

Initially, the meshing of the two gears is simulated with racks, similarity transformation is effected on the composite curve consisting of the envelope obtained by axially projecting the movement loci of the rack teeth relative to each other from the tooth trace opening portion to the tooth trace inner extremity in sections perpendicular to the axis and the movement locus in the vicinity of the tooth trace inner extremity, and the resulting curve is adopted as the basic addendum profile of the external teeth and the internal teeth.

Next, the rack axial direction deviation from the rack-approximated tooth profile at the contact point in sections perpendicular to the axis that arises in actual meshing is resolved into that caused by the inclination angle of the tooth center line of the external tooth of the flexible external gear relative to the tooth space center line of the internal tooth of the rigid internal gear and that caused by shift of the movement locus of the tooth of the flexible external gear from the rack movement locus, and the basic addendum profile of the external gear and the internal gear is corrected so that the algebraic sum of the resolved deviations becomes zero.

The dedendum profile of the internal tooth is formed by effecting interference prevention correction similar to that just described on a tooth profile generated by movement of the uncorrected addendum profile of the external tooth in the vicinity of the major axis of the tooth trace opening portion as a rack.

The dedendum profile of the external tooth is formed like the dedendum profile of the internal tooth, with or without imparting some amount of clearance.

In the invention flexible meshing type gear device provided with the so-formed tooth profile, both gears effect continuous contact meshing in a section perpendicular to the axis at the tooth trace opening portion of the external tooth and the tooth trace inner extremity. They also effect continuous contact meshing along the tooth trace between the tooth trace opening portion and the tooth trace inner extremity.

BRIEF DESCRIPTION OF THE DRAWINGS

FIG. 1 shows a perspective view and a front view of a typical wave gear drive.

BEST MODE FOR CARRYING OUT THE INVENTION

Figure 2:
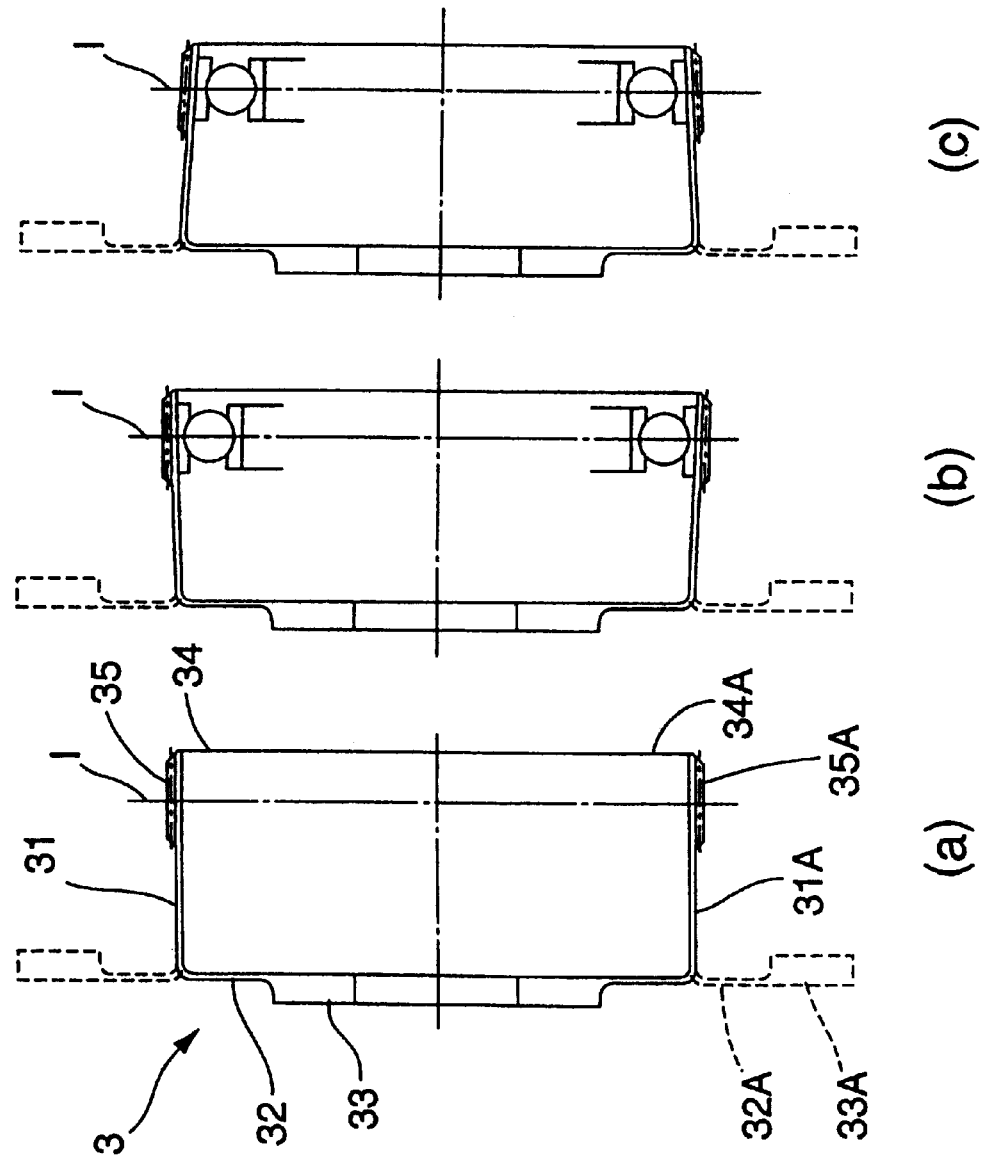
FIG. 2 is a set of diagrams for explaining how a cup-shaped or silk-hat-shaped flexible external gear is flexed by coning, in which (a) is a section through the axis before deformation, (b) is a section through the axis including the major axis of the wave generator, and (c) is a section through the axis including the minor axis of the wave generator.

FIG. 1 shows a perspective view and a front view of a typical wave gear drive. FIGS. 2 is a set of diagrams illustrating the flexed state in sections through the axis of a flexible external gear caused by so-called coning, namely, by flexing the opening portion of the flexible external gear into elliptical shape, (a) showing the appearance before deformation, (b) showing a section through the axis including the major axis of the wave generator, and (c) showing a section through the axis including the minor axis.

As shown in these figures, a flexible meshing type gear device 1 has a rigid internal gear 2, a cup-shaped flexible external gear 3 and a wave generator 4. The flexible external gear 3 comprises a cylindrical body 31, an annular diaphragm 32 extending radially inward continuously from one end of the cylindrical body 31, a boss 33 formed at the center of the diaphragm 32, and external teeth 35 formed on an opening portion 34 side of the outer peripheral surface of the cylindrical body 31. The external teeth 35 can mesh with internal teeth 25 formed on the internal peripheral surface of the rigid internal gear 2.

The wave generator 4 flexes sections of the body 31 of the flexible external gear 3 perpendicular to the axis thereof into an elliptical shape such that the amount of deflection increases from the diaphragm 32 side thereof toward the opening portion 34 side thereof approximately in proportion to distance from the diaphragm. External teeth located at opposite ends of the major axis 4a of the ellipse mesh with internal teeth and rotation of the wave generator moves the mesh positions in the circumferential direction to produce relative rotation between the two gears 2, 3.

The flexed state produced by coning of a silk-hat-shaped flexible external gear is also shown in FIG. 2 by broken lines. The silk-hat shaped flexible external gear 3A is composed of a cylindrical body 31A, an annular diaphragm 32A extending radially outward continuously from one end of the body 31A, an annular boss 33A formed to extend continuously from the outer peripheral edge of the diaphragm 32A, and external teeth 35A formed on an opening portion 34A side of the outer peripheral surface of the cylindrical body 31A. The invention can be applied similarly to either a cone-shaped or silk-hat-shaped flexible external gear.

Figure 3:
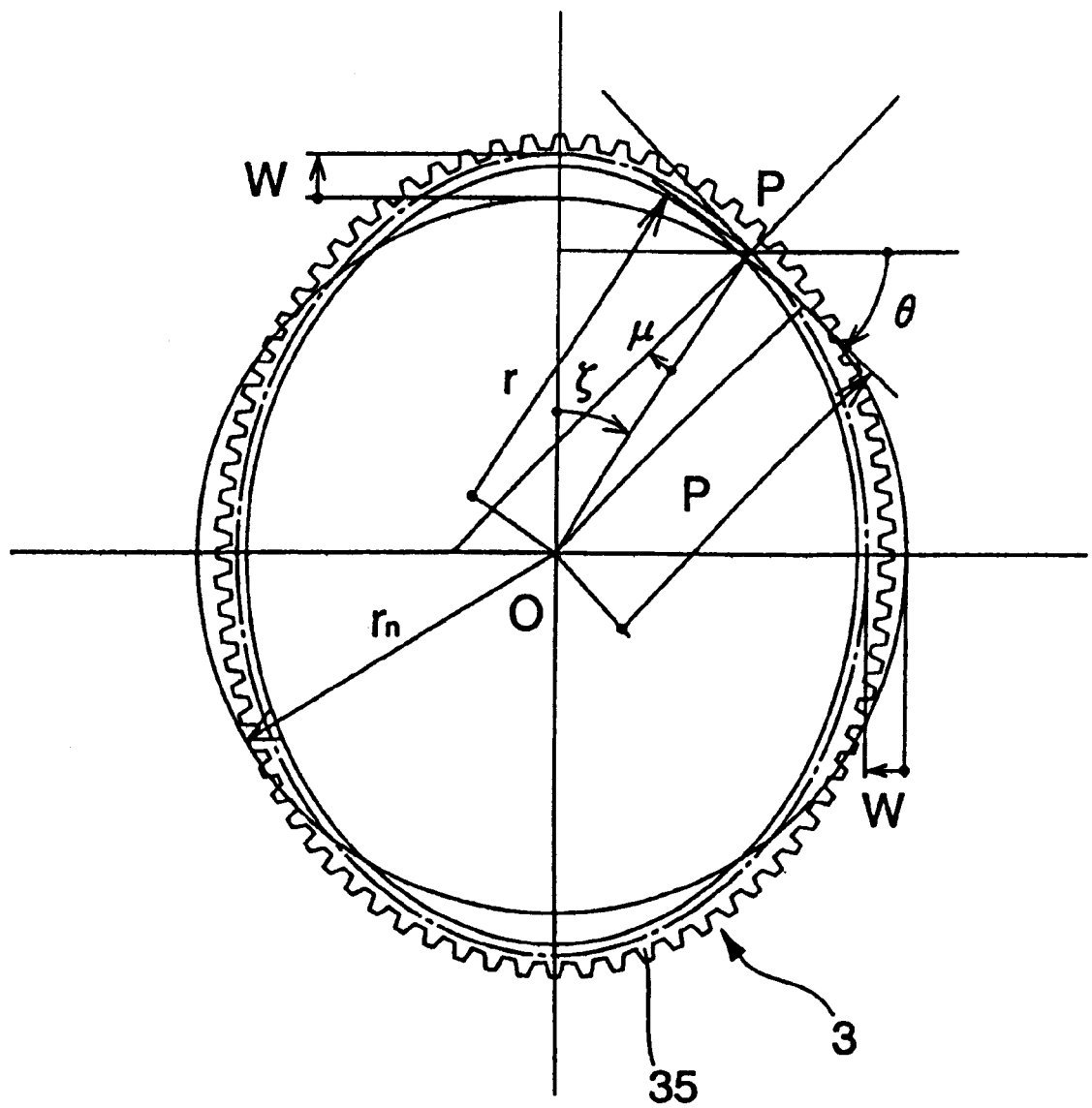
FIG. 3 is an explanatory diagram showing the elliptically flexed state of a flexible external gear on which the invention is based.

In the following explanation, the dedendum height coefficient, the thickness coefficient of the tooth bottom rim and the radius of the neutral curve of the rim of the external teeth 35 of the flexible external gear 3 are defined as $h_{fF}^*$, $t^*$ and $r_n$ and consideration is given to the case where the difference between the number of teeth $z_C$, $z_F$ of the rigid internal gear 2 and the flexible external gear 3 is 2g (=$z_C$-$z_F$, g being a positive integer). The method of the invention will be explained with regard to the example of FIG. 3, wherein the shape of the neutral curve of the rim of the flexible external gear 3 in sections perpendicular to the axis is the approximated ellipse, expressed by the polar coordinates (r, ζ) of Equations (1), obtained by superimposing on a true circle of radius $r_n$ a sine wave having a total amplitude of $2\kappa_e gm$ ($\kappa_e \leq 1$, m being a module) at the opening portion, of $2\kappa_i gm$ ($\kappa_i < \kappa_e$) at the inner extremity and of $2w=2\kappa gm$ ($\kappa_i \leq \kappa \leq \kappa_e$) at an arbitrary section, and a wavelength equal to one half the circumference.

$$r = p/\cos \mu = \{r_n + \kappa mg \cos(2\theta)\}/\cos \mu$$

$$\zeta = \theta - \mu$$

where $$r_n = m(0.5z_F - h_{fF}^* - 0.5t)$$

$$\mu = \tan^{-1} [2\kappa mg \sin(2\theta)/\{r_n + \kappa mg \cos(2\theta)\}] (\kappa_i \leq \kappa \leq \kappa_e)$$

p=vertical distance from origin 0 to tangent at point P on rim neutral curve  (1)

In the flexible meshing type gear device 1 of this invention, the first step is to derive the basic tooth profile to be used as the fundamental pattern (the uncorrected tooth profile) by simulating the meshing of the gears with racks and then similarity transforming the movement locus of the teeth of the racks relative to each other. This is the same as the method disclosed by the inventor in JP-A 5-172195. After the basic tooth profile has been determined, it is corrected for the actual finite number of teeth to obtain the final tooth profile (corrected tooth profile).

(Method of forming the uncorrected tooth profile)

Figure 4:
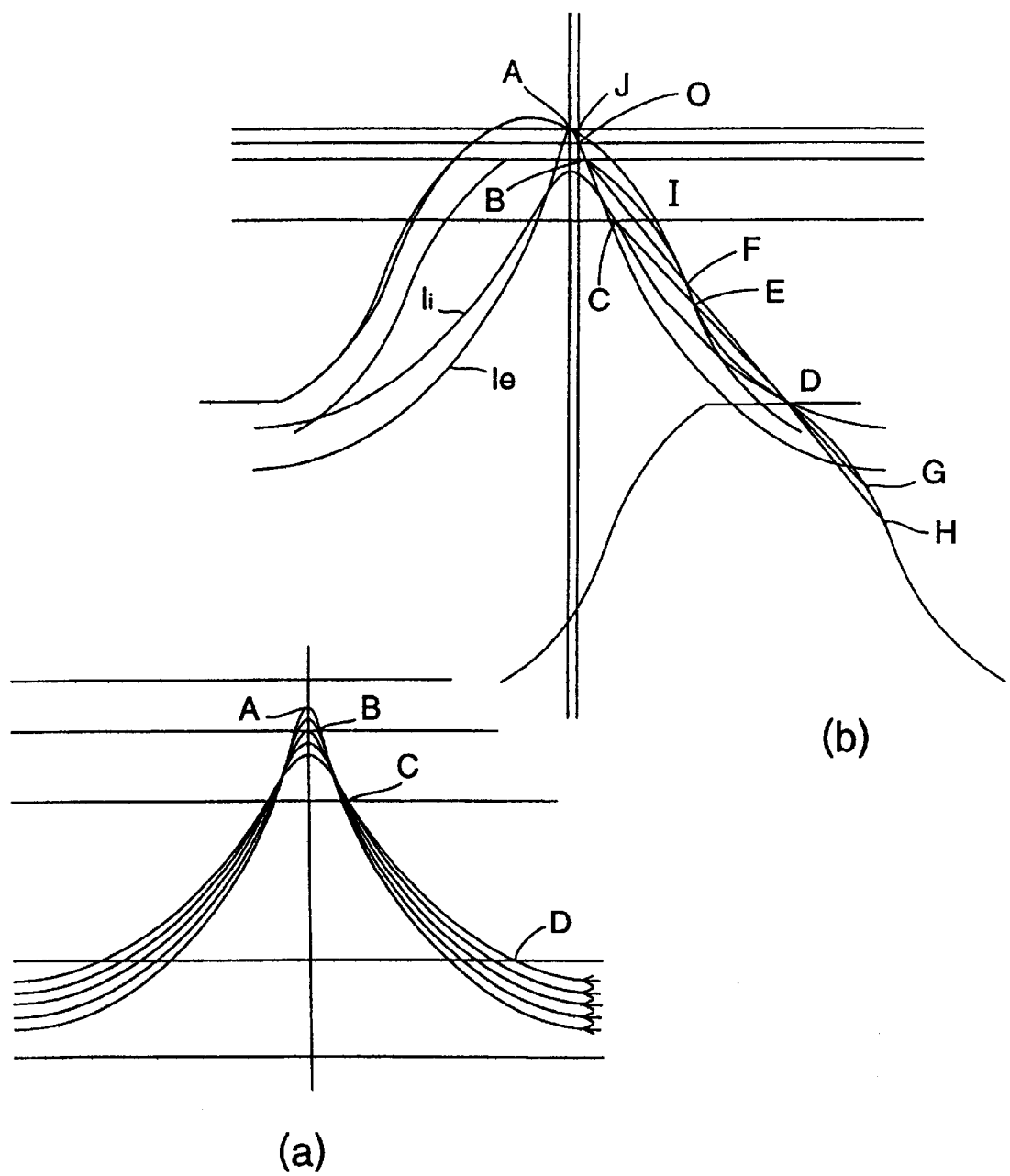
FIG. 4 is a set of explanatory diagrams illustrating the principle of tooth profile formation according to the invention.

FIG. 4 is a set of explanatory diagrams illustrating the method of configuring the tooth profile. The prototype from which the tooth profile of the invention is derived is the composite curve BCD in these diagrams. This curve is based on the rack-approximated movement locus of the teeth of the flexible external gear with respect to the rigid internal gear. Curve BC is an envelop curve obtained by superimposing in the axial direction the movement loci in sections perpendicular to the axis from the opening portion to near the inner extremity (see FIG. 4(a)), and the movement locus $I_e$ of the flexible external gear tooth having its vertex at point A in a section of the opening portion perpendicular to the axis connects smoothly with curve BC at point B. Point B is also the inflection point of the opening portion locus $I_e$. Curve CD is a portion of the movement locus $I_i$ in a section perpendicular to the axis near the inner extremity and connects smoothly with curve BC at point C. Point D is a point whose distance in the tooth height direction from point 0 midway between point A and point B is equal to twice the tooth height of the addendum profile common to both gears.

In the present invention, curve DEF obtained by defining point D as the center of simulation and reducing curve DCB at a reduction ratio of ½ and curve DGH radially symmetrical therewith constitute the pre-corrected convex tooth profile of the main portion of both addendums. Each consists of two curves and the coordinates and pressure angles of the tooth profiles of the DE and DG portions thereof, which effect continuous meshing in a section at the tooth trace inner extremity, are given by the following Equations (2) using $h_a^*$ as the addendum height coefficient, k as the tooth thickness coefficient, the x axis as the datum line, the y axis as the tooth center line, and auxiliary variable $\eta = 2\theta$.

$$x = m\{\pi/4 - (\pm k) - 0.25g(\eta - \kappa_i \sin \eta)\}$$

$$y = 0.5gm(\kappa_e - \kappa_i \cos \eta)$$

$$\alpha = \tan^{-1}\{(1 - \kappa_i \cos \eta)/(2\kappa_i \sin \eta)\} (\eta_i \leq \eta \leq \eta_a)$$

where $$\eta_i = \cos^{-1} \kappa_i$$

$$\eta_a = \cos^{-1}\{(\kappa_e - 2h_a^*/g)/\kappa_i\}$$  (2)

The coordinates and pressure angles of the tooth profiles of the EF and GH portions in FIG. 4, which effect meshing along the tooth trace, are given by Equations (3).

$$x = m\{\pi/4 - (\pm k) - 0.25g(\eta - \kappa \sin \eta)\}$$

$$y = 0.5gm(\kappa_e - \cos^2 \eta)$$

$$\alpha = \tan^{-1}(\tan \eta/2) (\eta_e \leq \eta \leq \eta_i)$$

where $$\kappa = \cos \eta$$

$$\eta_e = \cos^{-1} \kappa_e$$

$$\eta_i = \cos^{-1} \kappa_i$$  (3)

The pre-corrected concave tooth profile constituting the main portion of the dedendum also consists of two curves. These are, for instance, the curve enveloped by the GH portion and the curve enveloped by the DG portion of the convex tooth profile DGH in FIG. 4. For these, the amounts Dx, Dy to be added to the x, y coordinates of the concave tooth profile (not shown in the drawing) radially symmetrical with the convex tooth profile DEF relative to point F can be obtained from the rack approximation process, via the pressure angle α, by following the movement of a point on the aforesaid convex tooth profile accompanying the motion of the AB portion of the opening portion rack movement locus, in the manner of Equations (4).

$$Dx = 0.5gm\{\eta - \eta_e - \kappa_e (\sin \eta - \sin \eta_e)\}$$

$$Dy = \kappa_e gm(\kappa_e - \cos \eta)$$

where $$\eta = \cos^{-1} [\{1 + 4 \tan^2 \alpha \sqrt{(\kappa_e^2 - (1 - \kappa_e^2)/4 \tan^2 \alpha)}\} / \{\kappa_e (1 + 4 \tan^2 \alpha)\}] \quad (4)$$

Owing to the process through which they were established, the addendum and dedendum profiles obtained as set out above properly contact as racks in sections from the opening portion to the inner extremity. Other than in sections at the opening portion and the inner extremity, however, the movement loci in the sections contact only at the point where they touch envelope BC.

When these tooth profiles are used unmodified in an actual flexible meshing type gear device, however, the tooth inclination and change in tooth movement locus that arise owing to the finite number of teeth produce interference between the teeth.

The invention taught by '228 invention discussed earlier attempts to eliminate tooth interference by focusing on the tooth inclination aspect of this problem. As pointed out earlier, however, it ends up overestimating the tooth interference because it effects insufficient tooth inclination analysis and ignores the change in tooth movement locus. The inventor discovered the following method enabling the amount of interference to be determined more precisely.

(Method of forming corrected tooth profile)

Figure 5:
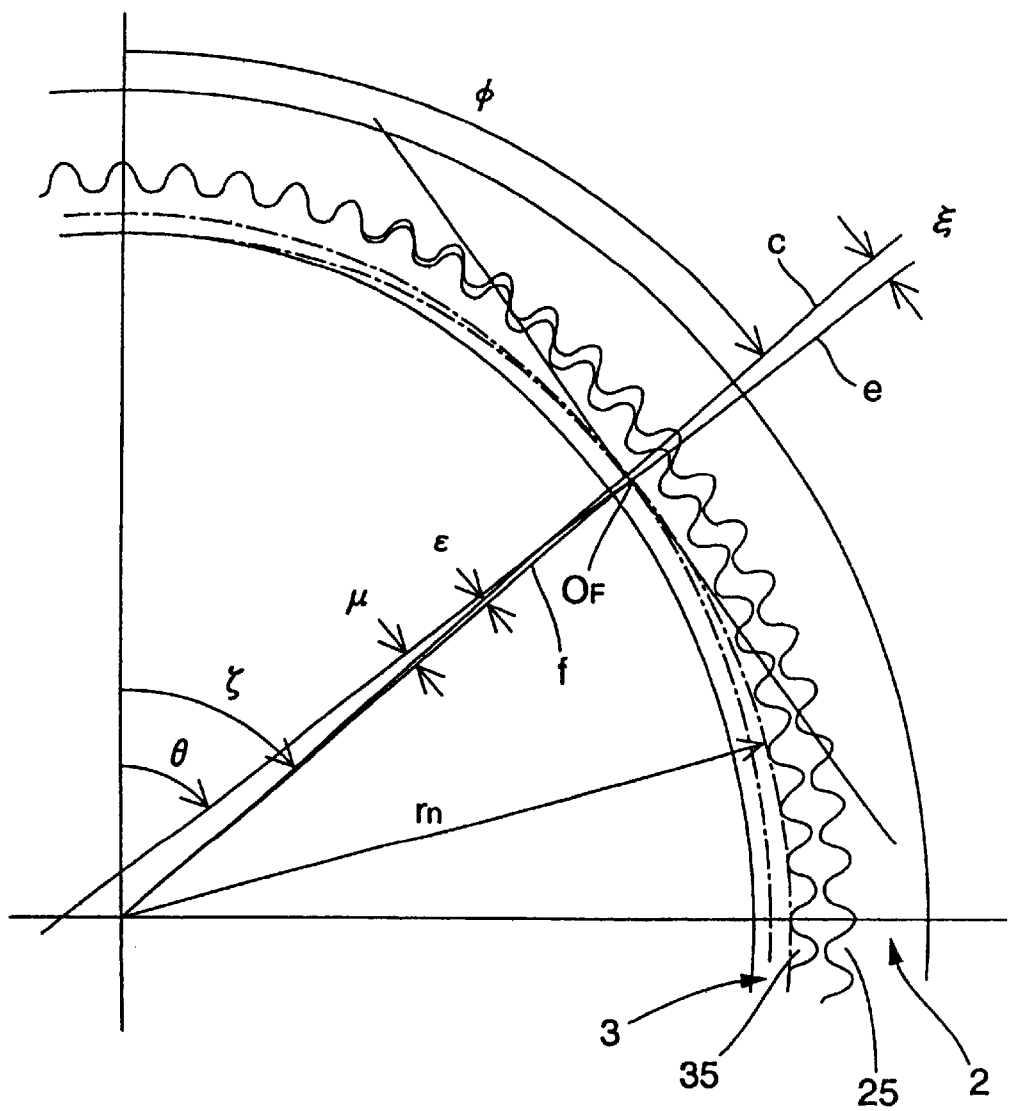
FIG. 5 is an explanatory diagram showing the mutual positional relationship between a tooth space center line of the rigid internal gear and the tooth center line of the tooth of the flexible external gear at the tooth space.

FIG. 5 shows the mutual positional relationship between the tooth space center line of an internal tooth 25 of the rigid internal gear 2 and the tooth center line e of the external tooth of the flexible external gear 3 at the tooth space. Angle ξ is the angle between the two center lines. Assuming the rotation angle jφ of the flexible external gear to be equivalent to the auxiliary variable 0.5η for a rack, letting φ=0.5η/j, and using the relationship between φ and θ, this angle ξ and angle ε between the tooth space center line c of the rigid internal gear and the radius f passing through the base point $O_F$ on the rim center line of the flexible external gear are given by Equations (5).

$$\xi = \theta - 0.5\eta/j$$

$$\epsilon = \xi - \phi = \theta - \mu - 0.5\eta/j$$

where $$\eta = 2\{\theta - 1.5\kappa gm \sin(2\theta)/r_n\}$$

$$j = z_C/z_F$$

$$\mu = \tan^{-1} [2\kappa gm \sin(2\theta)/\{r_n + \kappa gm \cos(2\theta)\}] \quad (5)$$

Figure 6:
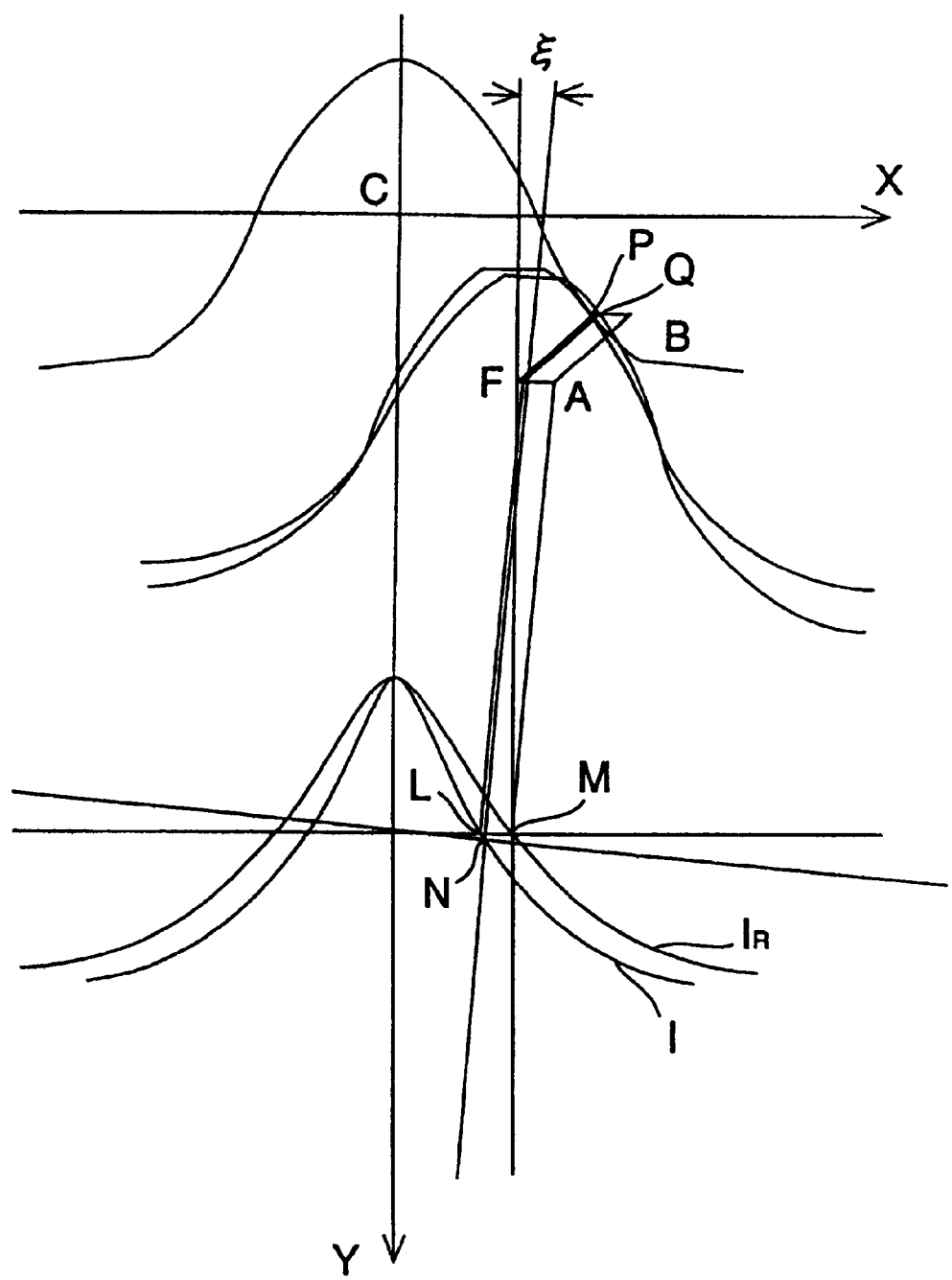
FIG. 6 is an explanatory diagram illustrating a technique for deriving a tooth profile enabling proper contact by eliminating tooth profile interference from a basic tooth profile derived by rack approximation.

FIG. 6 shows, in a section at the tooth trace inner extremity, the aforesaid tooth inclination of angle ξ of the rack tooth profile as well as the manner in which interference arises when a change in the movement locus of the tooth of the flexible external gear from $I_R$ (that in the case of a rack) to I causes the coordinate system origin to shift from M to N. Defining the radius of the pitch point C of the rigid internal gear as $$r_c = \{0.5z_c - g(1 - \kappa_e)\}m \quad (6)$$

the rack movement locus $I_R$ in the drawing can be represented in X, Y coordinates of an orthogonal system having point C as its origin by Equations (7).

$$X = 0.5gm(\eta - \kappa_i \sin \eta)$$

$$Y = r_c - r_n - \kappa_i g_m \cos \eta (\eta_i \leq \eta \leq \eta_a) \quad (7)$$

Giving η an arbitrary value in the foregoing range, the rack tooth profiles corresponding to this value properly mesh at contact point P as shown in the diagram. The point at which a line drawn normal to the rack tooth profile at point P intersects the tooth center line of the rack is designated F. The point to which the origin of the rack coordinate system shifts at this time is designated M. Regarding the correspondence between the case of a rack and the case of a finite number of teeth, the relationship is again defined in the foregoing manner by assuming that the rotation angle jφ of the flexible external gear is equivalent to 0.5η in the case of a rack.

Defining the tooth thickness coefficient of the flexible external gear as k, the coordinates of point P in the aforesaid coordinate system fixed on the tooth of the flexible external gear as x, y and the pressure angle as α, the length u of MF is given by Equation (8).

$$u = m(h_{fF}^* + t^*/2) + y - \tan \alpha x$$

where $$\tan \alpha = (1 - \kappa_i \cos \eta)/(2\kappa_i \sin \eta) \quad (8)$$

As shown in the drawing, the actual tooth profile described by the movement of the flexible external gear produces interference in the tooth thickness direction by length PQ. To find the amount of this interference, the displacement of contact point P with angle ξ and the displacement of the contact point P caused by deviation of the movement locus of the coordinate system origin from the movement locus as a rack are both considered as factors in calculating the tooth thickness interference amount.

The movement amount $dx_1$ of contact point P with angle ξ is given by Equation (9).

$$dx_1 = u\xi$$

where $$\xi = \theta - 0.5\eta/j$$

$$\eta = 2\{\theta - 1.5\kappa_i gm \sin(2\theta)/r_n\} \quad (9)$$

$dx_1$ corresponds to line segment FA or PB in FIG. 6. In other words, it is taken into account that, if the displacement of point P around point M owing to angle ξ is small and this displacement is resolved into the displacement of point F around point M perpendicular to the tooth center line owing to angle ξ and the displacement of point P around point F in the tooth profile direction owing to the angle ξ, it follows that the latter displacement does not produce interference.

The coordinate system origin OF of the tooth of the flexible external gear corresponding to the aforesaid η is at point N on the movement locus I thereof and the difference from the coordinate system origin M in the case of a rack must be taken into consideration. Specifically, the difference between the point N coordinates ($X_N$, $Y_N$) and the rack origin M coordinates ($X_M$, $Y_M$) is considered using the coordinate system fixed on the rigid internal gear. For this, the difference in the Y direction (tooth height direction) is converted into difference in the X direction (tooth thickness direction) using the pressure angle at point P and the result is added to the difference between the X coordinates of the two points. The interference is viewed as decreasing in proportion. ML or BQ in FIG. 6 is the amount $dx_2$ thereof. The pitch point C of the rigid internal gear being defined as $r_c$, the value of $dx_2$ is given by Equation (10).

$$dx_2 \Delta X + \tan \alpha \Delta Y$$

where $$\Delta X = X_M - X_N$$

$$\Delta Y = Y_N - Y_M$$

$$X_M = 0.5gm(\eta - \kappa_i \sin \eta)$$

$$Y_M = r_c - r_n - \kappa_i gm \cos \eta$$

$$X_N = \{r_n + \kappa_i gm \cos(2\theta)\} \sin \epsilon / \cos \mu$$

$$Y_N = r_C - \{r_n + \kappa_i gm \cos(2\theta)\} \cos \epsilon / \cos \mu$$

$$\eta = 2\{\theta - 1.5\kappa_i gm \sin(2\theta)/r_n\}$$

$$\epsilon = \xi - \mu$$

$$\mu = \tan^{-1} [2\kappa_i gm \sin(2\theta)/\{r_n + \kappa_i gm \cos(2\theta)\}] \quad (10)$$

Applying the same thinking with regard to the EF portion that handles meshing of the middle portion of tooth trace of the rack tooth profile, $dx_1$ and $dx_2$ are calculated by Equations (11) and (12).

$$dx_1 = u\xi$$

where $$u = m(h_{fF}^* + t^*/2) + y - \tan \alpha X$$

$$\tan \alpha = 0.5 \tan \eta (\eta_e \leq \eta \leq \eta_i)$$

$$\xi = \theta - 0.5\eta/j$$

$$\eta = 2\{\theta - 1.5\kappa gm \sin(2\theta)/r_n\} \quad (11)$$

$$dx_2 = X_M - X_N + \tan \alpha (Y_N - Y_M)$$

where $$X_M = 0.5gm(\eta - \kappa \sin \eta)$$

$$Y_M = r_c - r_n - \kappa gm \cos \eta$$

$$X_N = \{r_n + \kappa gm \cos(2\theta)\} \sin \epsilon / \cos \mu$$

$$Y_N = r_c - \{r_n + \kappa gm \cos(2\theta)\} \cos \epsilon / \cos \mu$$

$$\epsilon = \xi - \mu$$

$$\mu = \tan^{-1} [2\kappa gm \sin(2\theta)/\{r_n + \kappa gm \cos(2\theta)\}] \quad (12)$$

The interference amount δ in the tooth thickness direction at the contact point between the convex tooth profiles of the rack tooth profile is therefore given by Equation (13).

$$\delta = dx_1 - dx_2 \quad (13)$$

From this it follows that a convex tooth profile realizing a non-interfering wide mesh range can be obtained by correcting the convex tooth profile of both gears using 0.5δ as the single-side tooth correction (reduction) amount $dx_w$.

Next, the amount of interference arising at the concave dedendum profile is obtained. The method used is the same as that used to obtain the addendum interference amount. Specifically, the following Equations (14) and (15) apply when, in the aforesaid tooth profile coordinate system fixed on the tooth of the flexible external gear, the coordinates of the point where the pre-corrected addendum profile of the flexible external gear contacts the pre-corrected dedendum profile of the rigid internal gear are defined as x, y, and the auxiliary variable and the pressure angle in this case are defined as η and α, respectively.

$$dx_{e1} = \{m(h_{fF}^* + 0.5t) + y - \tan \alpha \, x\}\xi$$

where $$\tan \alpha = (1 - \kappa_e \cos \eta)/(2\kappa_e \sin \eta)$$

$$\xi = \theta - 0.5\eta/j$$

$$\eta = 2\{\theta - 1.5\kappa_e gm \sin(2\theta)/r_n\} \quad (14)$$

$$dx_{e2} = \Delta X + \tan \alpha \Delta Y$$

where $$\Delta X = 0.5gm(\eta - \kappa_e \sin \eta) - \{r_n + \kappa_e gm \cos(2\theta)\} \sin \epsilon / \cos \mu$$

$$\Delta Y = r_n + \kappa_e gm \cos \eta - \{r_n + \kappa_e gm \cos(2\theta)\} \cos \epsilon / \cos \mu$$

$$\epsilon = \xi - \mu$$

$$\mu = \tan^{-1} [2\kappa_e gm \sin(2\theta)/\{r_n + \kappa_e gm \cos(2\theta)\}] \quad (15)$$

After $dx_{e1}$ and $dx_{e2}$ have been calculated using these equations, they and aforesaid correction values $dx_1$ and $dx_2$ for the corresponding uncorrected addendum convex tooth profile are used to determine the correction amount $dx_w$ of the x coordinate by $$dx_w = dx_{e1} - dx_{e2} - 0.5(dx_1 - dx_2) \quad (16)$$

and this correction is applied to configure the final dedendum profile of the rigid internal gear.

Figure 7:
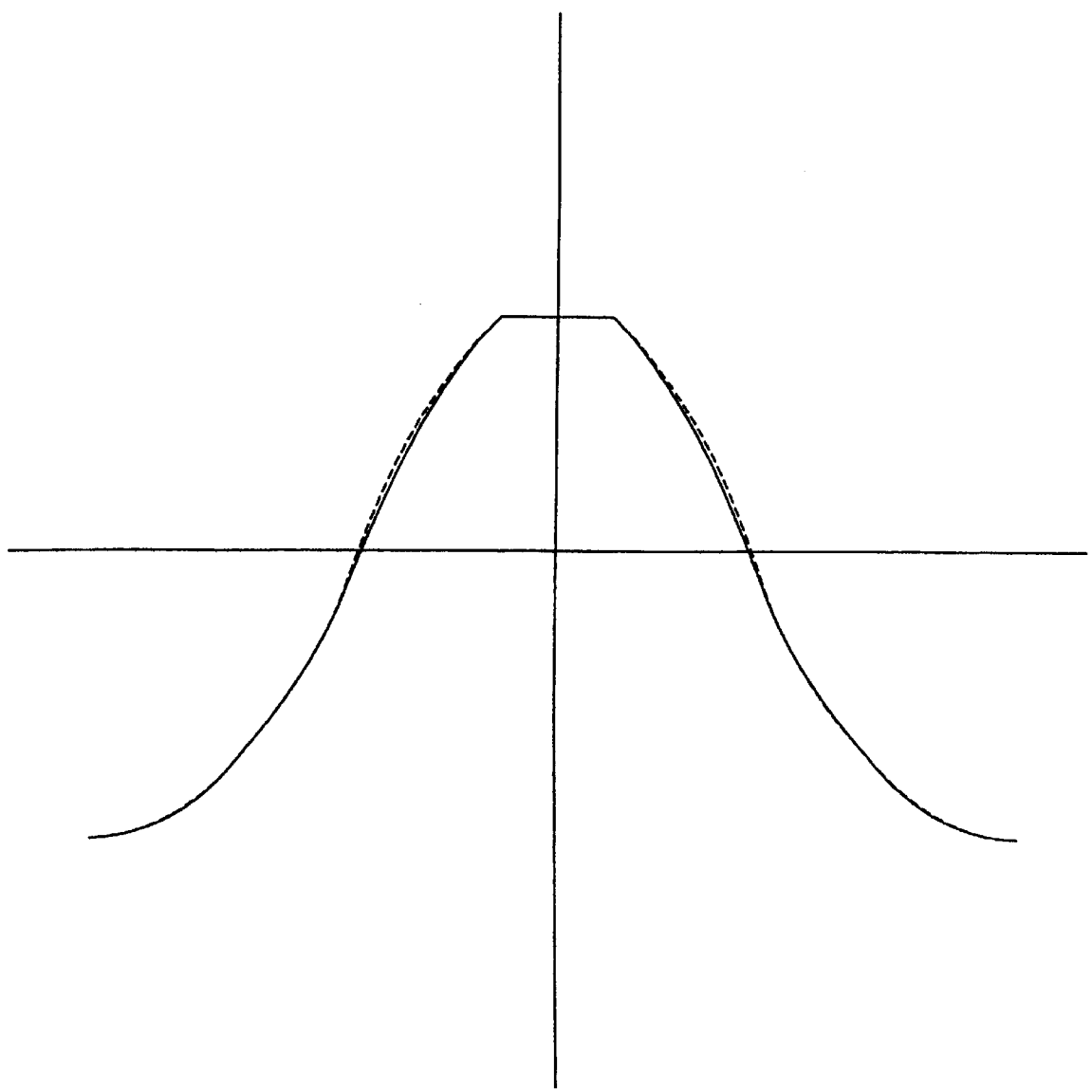
FIG. 7 shows an example of a flexible external gear tooth profile of the invention type.

FIG. 7 shows an example of a flexible external gear tooth profile obtained by the invention method for the case where the number of teeth $z_c = 124$, $z_F = 120$, deflection coefficient $\kappa_e = 0.8$, $\kappa_i = 0.6$. The broken line in the figure shows the uncorrected tooth profile.

Figure 8:
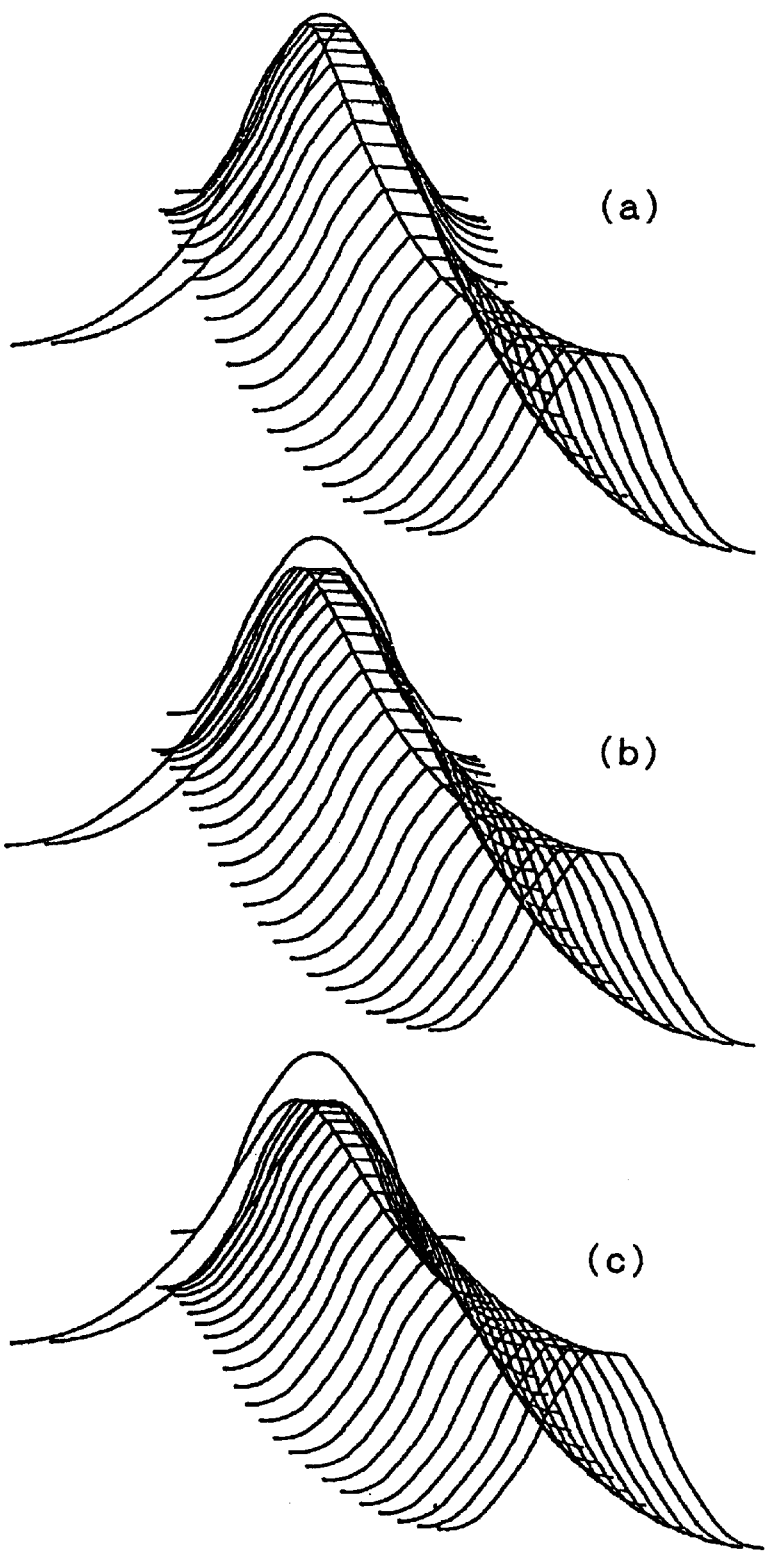
FIG. 8 is a set of explanatory diagrams showing meshing simulation in a flexible meshing type gear device having an invention type tooth profile, in sections perpendicular to the axis at (a) the opening portion, (b) the middle in the tooth trace direction, and (c) the inner extremity.

FIG. 8 shows meshing of the invention tooth profile in the case of FIG. 7, in sections perpendicular to the axis at (a) the opening portion, (b) the middle in the tooth trace direction, and (c) the inner extremity.

The present invention holds for an arbitrary angle of coning of a cup-shaped or silk-hat-shaped flexible external gear and can also be applied to a flexible external gear of the type having a short body length. Moreover, the present invention also encompasses the special case of an annular flexible external gear without coning.

INDUSTRIAL APPLICABILITY

As explained in the foregoing, in the flexible meshing type gear device of the present invention, the rack-approximated tooth profile the inventor developed with consideration to the coning of the flexible external gear so as to enable correct meshing over the entire tooth trace (JP-A 5-172195) is corrected taking into account the flexible external gear tooth inclination and change in movement locus of the tooth profile coordinate system origin so as to enable correct wide-range tooth meshing over the entire tooth trace even when the number of teeth is small.

The present invention therefore enables proper wide-range meshing without giving rise to interference between the identical tooth profiles of the two gears and, by this, enables reduction of tooth surface pressure, increases permissible delivered torque and enhances meshing rigidity.

What is claimed is:

1. A flexible meshing type gear device including a rigid internal gear, a cup-shaped or silk-hat-shaped flexible external gear and a wave generator, the flexible external gear including a cylindrical body, a diaphragm formed continuously with one end of the body to extend radially inward or outward and external teeth formed on an outer peripheral surface of an opening portion of the body, the external teeth being capable of meshing with internal teeth formed on an internal peripheral surface of the rigid internal gear, the wave generator flexing sections of the body of the flexible external gear perpendicular to an axis of the body into an elliptical shape such that the amount of deflection increases from the diaphragm side thereof toward the opening portion thereof approximately in proportion to distance from the diaphragm, thereby meshing external teeth located at opposite ends of a major axis of the ellipse with the internal teeth, rotation of the wave generator moving the mesh positions of the two gears in a circumferential direction to produce relative rotation between the two gears, which flexible meshing type gear device is a flexible meshing type gear device having a three-dimensional non-interfering wide mesh range tooth profile characterized in that both gears are defined as spur gears of module m, the number of teeth of the flexible external gear as $z_F$ and the number of teeth of the rigid internal gear as $z_c = z_F + 2g$ (g being a positive integer), amount of radial deflection of a tooth trace opening portion of the flexible external gear in a section perpendicular to the axis is defined as $\kappa_e$ gm ($\kappa_e \leq 1$, $\kappa_e$: opening portion deflection coefficient), amount of radial deflection of an inner extremity of the tooth trace of the flexible external gear is defined as $\kappa_i$ gm ($\kappa_i < \kappa_e$, $\kappa_i$: inner extremity deflection coefficient), meshing of the two gears is simulated with racks, similarity transformation is effected on a composite curve consisting of an envelope obtained by axially projecting movement loci of rack teeth relative to each other from the tooth trace opening portion to the tooth trace inner extremity in sections perpendicular to the axis and a movement locus near the tooth trace inner extremity, and the resulting curve is adopted as a basic addendum profile of the external teeth and the internal teeth, rack axial direction deviation from the rack-approximated tooth profile at a contact point in sections perpendicular to the axis that arises in actual meshing is resolved into that caused by an inclination angle of a tooth center line of the external tooth of the flexible external gear relative to a tooth space center line of the internal tooth of the rigid internal gear and that caused by shift of a movement locus of the tooth of the flexible external gear from a rack movement locus, and the basic addendum profile of the external gear and the internal gear is corrected so that an algebraic sum of the resolved deviations becomes zero, a dedendum profile of the internal tooth is formed by effecting similar interference prevention correction on a tooth profile generated by movement as a rack of the uncorrected addendum profile of the external tooth near a major axis of the tooth trace opening portion, and a dedendum profile of the external tooth is formed similarly to the dedendum profile of the internal tooth, with or without imparting some amount of clearance, the external tooth and the internal tooth effecting continuous contact meshing in a section perpendicular to the axis at the tooth trace opening portion of the external tooth and the tooth trace inner extremity, and continuous contact meshing along the tooth trace between the tooth trace opening portion and the tooth trace inner extremity.

2. A flexible meshing type gear device having a three-dimensional non-interfering wide mesh range tooth profile according to claim 1, characterized in that where an addendum height coefficient of both gears is defined as $h_a^*$, a dedendum height coefficient of the flexible external gear as $h_{fF}^*$, thickness coefficient of the tooth bottom rim of the flexible external gear as $t^*$, radius of a neutral curve of a bottom rim of the flexible external $r_n$, tooth thickness coefficient for increasing tooth thickness of the internal tooth of the rigid internal gear and tooth thickness coefficient for reducing tooth thickness of the external tooth of the flexible external gear as k, tooth number ratio $z_c/z_F$ as j, an auxiliary angle variable as η, and the sign of symbol k of the addendum profiles of the gears in a coordinate system whose x axis is a datum line thereof and whose y axis is the tooth center line thereof as + in the case of the flexible external gear and − in the case of the rigid internal gear, a portion of the addendum profile that handles inner extremity meshing is formed to have a tooth profile of $x = x_0 - dx_w$ $y = 0.5gm (\kappa_e - \kappa_i \cos \eta)$ ($\eta_i \leq \eta \leq \eta_a$)

where $x_0 = m\{0.25\pi - 0.25g(\eta - \kappa_i \sin \eta) - (\pm k)\}$ $\eta_i = \cos^{-1} \kappa_i$ $\eta_a = \cos^{-1} \{(\kappa_e - 2h_a^*/g)/\kappa_i\}$ $dx_1 = \{m(h_{fF}^* + 0.5t) + y - \tan \alpha x_0\}\xi$ $\tan \alpha = (1 - \kappa_i \cos \eta)/(2\kappa_i \sin \eta)$ $\xi=\theta-0.5\eta/j$ $\eta=2\{\theta-1.5\kappa_i gm \sin(2\theta)/r_n\}$ $dx_2=\Delta X+\tan \alpha \Delta Y$ $\Delta X=0.5gm(\eta-\kappa_i \sin \eta)-\{r_n+\kappa_i gm \cos(2\theta)\} \sin \epsilon/\cos \mu$ $\Delta Y=r_n+\kappa_i gm \cos \eta-\{r_n+\kappa_i gm \cos(2\theta)\} \cos \epsilon/\cos \mu$ $\epsilon=\xi-\mu$ $\mu=\tan^{-1} [2\kappa_i gm \sin(2\theta)/\{r_n+\kappa_i gm \cos(2\theta)\}]$ $dx_w=0.5(dx_1-dx_2)$ a portion of the addendum profile that handles tooth trace meshing is formed to have a tooth profile of $x=x_0-dx_w$ $y=0.5gm(\kappa_e-\cos^2 \eta) \ (\eta_e \leq \eta \leq \eta_i)$ where $x_0=m\{0.25\pi-0.25g(\eta-\kappa \sin \eta)-(\pm k)\}$ $\kappa=\cos \eta$ $\eta_e=\cos^{-1} \kappa_e$ $\eta_i=\cos^{-1} \kappa_i$ $dx_1=\{m(h_{fF}*+0.5t*)+y-\tan \alpha x_0\}\xi$ $\tan \alpha=0.5 \tan \eta$ $\xi=\theta-0.5\eta/j$ $\eta=2\{\theta-1.5\kappa gm \sin(2\theta)/r_n\}$ $dx_2=\Delta X+\tan \alpha \Delta Y$ $\Delta X=0.5gm(\eta-\kappa \sin \eta)-\{r_n+\kappa gm \cos(2\theta)\} \sin \epsilon/\cos \mu$ $\Delta Y=r_n+\kappa gm \cos \eta-\{r_n+\kappa gm \cos(2\theta)\} \cos \epsilon/\cos \mu$ $\epsilon=\xi-\mu$ $\mu=\tan^{-1} [2\kappa gm \sin(2\theta)/\{r_n+\kappa gm \cos(2\theta)\}]$ $dx_w=0.5(dx_1-dx_2)$ the dedendum profile of the rigid internal gear is first formed as a concave tooth profile radially symmetrical with the uncorrected addendum profile of the flexible external gear relative to an end point on a datum point side and, taking into account generating movement by rack-approximation movement of the uncorrected addendum profile of the flexible external gear near the major axis of the opening portion, Dx and Dy correction of the concave tooth profile in the x-axis and y-axis directions is effected via a pressure angle $\alpha$ as $Dx=0.5gm\{\eta-\eta_e-\kappa_e (\sin \eta-\sin \eta_e)\}$ $Dy=gm\kappa_e(\kappa_e-\cos \eta)$ where $\eta=\cos^{-1} [\{1+4 \tan^2 \alpha \sqrt{(\kappa_e^2-(1-\kappa_e^2)/4/\tan^2 \alpha)}\}/\{\kappa_e(1+4 \tan^2 \alpha)\}]$ the x and y coordinates of the uncorrected addendum profile of the flexible external gear are further used to calculate correction components $dx_{e1}$ and $dx_{e2}$ for avoiding interference with the concave tooth profile of the rigid internal gear as $dx_{e1}=\{m(h_{fF}*+0.5t*)+y-\tan \alpha x_0\}\xi$ $\tan \alpha=(1-\kappa_e \cos \eta)/(2\kappa_e \sin \eta)$ $\xi=\theta-0.5\eta/j$ $\eta=2\{\theta-1.5\kappa_e gm \sin(2\theta)/r_n\}$ $dx_{e2}=\Delta X+\tan \alpha \Delta Y$ $\Delta X=0.5gm(\eta-\kappa_e \sin \eta)-\{r_n+\kappa_e gm \cos(2\theta)\} \sin \epsilon/\cos \mu$ $\Delta Y=r_n+\kappa_e gm \cos \eta-\{r_n+\kappa_e gm \cos(2\theta)\} \cos \epsilon/\cos \mu$ $\epsilon=\xi-\mu$ $\mu=\tan^{-1} [2\kappa_e gm \sin(2\theta)/\{r_n+\kappa_e gm \cos(2\theta)\}]$ a correction amount $dx_w$ of the x coordinate of the concave tooth profile of the rigid internal gear is determined from the calculated values, with adjustment for the correction amounts $dx_1$ and $dx_2$ of the dedendum profile of the flexible external gear, as $dx_w=dx_{e1}-dx_{e2}-0.5(dx_1-dx_2),$ this correction is effected to form the final dedendum profile of the rigid internal gear, and a dedendum profile of the flexible external gear is formed similarly to the dedendum profile of the rigid internal gear, with or without imparting some amount of clearance.

\* \* \* \* \*